(12) United States Patent
Hartmann et al.

(10) Patent No.: US 10,160,599 B2
(45) Date of Patent: Dec. 25, 2018

(54) CHUTE AND SORTING INSTALLATION, AND METHOD FOR SORTING ARTICLES

(71) Applicants: Bernd Hartmann, Grafschaft-Leimersdorf (DE); Wolfram Grafe, Elemenhorst (DE)

(72) Inventors: Bernd Hartmann, Grafschaft-Leimersdorf (DE); Wolfram Grafe, Elemenhorst (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/596,631

(22) Filed: May 16, 2017

(65) Prior Publication Data

US 2017/0334647 A1  Nov. 23, 2017

(30) Foreign Application Priority Data

May 20, 2016 (DE) .................. 10 2016 109 310

(51) Int. Cl.
*B65G 11/10* (2006.01)
*B65G 11/02* (2006.01)
*B65G 11/20* (2006.01)
*B07C 3/06* (2006.01)

(52) U.S. Cl.
CPC .............. *B65G 11/103* (2013.01); *B07C 3/06* (2013.01); *B65G 11/023* (2013.01); *B65G 11/203* (2013.01)

(58) Field of Classification Search
CPC ............................. B65G 11/10; B65G 11/103
USPC ................................................. 193/23, 25 C
See application file for complete search history.

(56) References Cited

U.S. PATENT DOCUMENTS

| 397,985 A | * | 2/1889 | Herron ........................ 193/25 C |
| 4,485,910 A | * | 12/1984 | Tabler ...................... B65G 1/08 |
| | | | 193/36 |
| 6,186,725 B1 | * | 2/2001 | Konstant .................. B65G 1/08 |
| | | | 193/36 |
| 6,557,724 B1 | * | 5/2003 | LeCroy .................. B65G 47/52 |
| | | | 198/435 |
| 6,564,922 B1 | | 5/2003 | Taylor et al. |
| 7,553,118 B1 | | 6/2009 | Doepker |
| 9,446,905 B2 | * | 9/2016 | Brockhoff ................ B65G 1/08 |

FOREIGN PATENT DOCUMENTS

| DE | 1 201 246 A | 9/1965 |
| DE | 40 41 268 A1 | 6/1992 |
| EP | 0 184 293 A1 | 6/1986 |
| JP | H02 97307 U | 8/1990 |
| JP | 2008-120468 A | 5/2008 |
| WO | WO 92/21111 A1 | 11/1992 |
| WO | WO 2013/091652 A1 | 6/2013 |
| WO | WO 2015/015439 A1 | 2/2015 |

* cited by examiner

*Primary Examiner* — James R Bidwell
(74) *Attorney, Agent, or Firm* — Reinhart Boerner Van Deuren P.C.

(57) ABSTRACT

The invention relates to a chute for articles, in particular packages and/or consignments, having a chute base for the article to slide down, having at least one storage installation, preferably assigned to the lower end of the chute, for the articles that have slid down along the chute base, wherein the storage installation is configured to be adjustable, in particular pivotable, from an upper receiving position for receiving the articles sliding down the chute into a lower discharging position for discharging the received articles, and back again.

14 Claims, 9 Drawing Sheets

CHUTE AND SORTING INSTALLATION, AND METHOD FOR SORTING ARTICLES

CROSS-REFERENCE TO RELATED PATENT APPLICATION

This patent application claims priority to German Application No. 10 2016 109 310.6, filed May 20, 2016, the entire teachings and disclosure of which are incorporated herein by reference thereto.

FIELD OF THE INVENTION

The invention relates to a chute for articles, in particular packages and/or consignments, having a chute base for the article to slide down, having at least one storage installation, preferably assigned to the lower end of the chute, for the articles that have slid down along the chute base. The invention also relates to a sorting installation for articles, in particular packages and/or consignments, having at least two chutes, arranged one above the other, for articles. In addition, the invention relates to a method for sorting articles, in particular packages and/or consignments, with a sorting installation comprising at least one chute, in which articles to be sorted are transported by a transporting device and are sorted at least partially into the at least one chute, and in which, after sliding down the chute base of the at least one chute, the articles sorted into the at least one chute are received by the storage installation arranged in an upper receiving position.

BACKGROUND OF THE INVENTION

Chutes for articles of the abovementioned type are used in particular for sorting packages and are configured as what are known as box chutes. In this case, the articles are sorted in a sorting installation, known as a sorter, into a plurality of chutes according to defined criteria. In the chutes, the articles slide downwards along the chute base to the end of the chute, where the articles are temporarily stored in a collecting region of the chute until the articles are removed from the chute, or the collecting region. The collecting region in this respect provides a storage installation of the chute.

In addition to the at least one chute of the abovementioned type, the sorting installation for sorting the articles also comprises at least one transporting device for transporting the articles to be sorted. The transporting device is in particular a belt conveyor or a roller conveyor. The articles are then sorted by the transporting device, in particular directly, into various chutes according to predetermined criteria. To this end, for example guiding devices, for instance in the form of flaps, can be provided, which guide or push the articles from the transporting device into the corresponding chutes. The articles then slide down the chute bases of the corresponding chutes and are then temporarily stored in the collecting regions at the ends of the chutes, until the articles are removed together, in succession or in part.

The articles can be for example products or goods. In particular, they are packages, these being articles, such as goods, consignments or other items, that are packaged with packing materials. Consignments are typically delivered to particular addresses. In addition, the consignments are often packages, that is to say packaged articles. Before the consignments are delivered to the addressees of the consignments, pre-sorting frequently takes place in a distribution centre, for instance in accordance with the geographical area of the addressees. The distribution centre can be for example what is known as a parcel sorting centre, a warehouse or the like. After being sorted, the consignments can be delivered or sorted further, which can take place for example at a different location from the previous sorting operation. The consignments can be delivered to the addressees of the consignments or to corresponding drop-off points, for example parcel boxes or Packstations.

In the present case, articles, packages and/or consignments are considered to be a variety of different items which can preferably be transported with reasonable effort as regards their size and their weight. These include items for everyday use, such as consumables or foodstuffs, and also technical items and equipment. In many cases, the consignments are letters, parcels and/or flyers. In this case, parcels also include packets, while flyers can also be leaflets, brochures and periodicals.

When the articles are intended to be sorted into a large number of different groups, a corresponding number of chutes is required. Alternatively, the articles would have to be sorted several times in succession in order for all the articles to be sorted into the predetermined groups of articles. In order to save time for sorting the articles, it is appropriate to execute the different sorting steps partially in parallel in several sorting installations. Irrespective of whether the articles are sorted in one sorting installation or in parallel in different sorting installations, sorting requires a great deal of space for the at least one sorting installation. The space requirement is all the higher, the greater the number of criteria according to which the articles are sorted. This is because it is then necessary for more chutes to be provided overall in order to sort the articles therein. In addition, the maximum throughput of a sorting installation, that is to say the number of articles that can be sorted per unit time with the sorting installation, is limited. If the maximum throughput is insufficient, either the sorting installation has to be expanded or a further sorting installation has to be used, this further increasing the space requirement.

If several sorting installations are used, these can be arranged in part one above another, in order to confine the space requirement. In this case, the sorting installations can be of identical construction and/or execute sorting of the same type. Here, it is possible for example for the transporting devices of the sorting installations to be arranged one above another. For the chutes, this typically applies only to a limited extent, since the articles sorted in the chutes have to be removed, in particular manually, from the chutes. Therefore, the collecting regions of the chutes have to be correspondingly accessible. The accessibility is generally achieved in that the chutes of all sorting installations are guided to a common level. This makes it necessary to position the collecting regions of the chutes at least in part alongside one another. Alternatively, it is also possible for several chutes to be arranged one above another. However, considerable design outlay is then additionally necessary in order to remove the articles from the collecting regions, arranged at different levels, of the chutes. Moreover, the removal of the articles from the chutes is then associated with additional effort.

BRIEF SUMMARY OF SOME EXEMPLARY EMBODIMENTS OF THE INVENTION

The present invention is based on the object of configuring and developing the chute, the sorting installation and the method, in each case of the type mentioned at the beginning and described in more detail above, such that a large number of articles can be sorted in a short time with, overall, a small space requirement and little effort.

This object is achieved in the case of a chute according to embodiments described in the claims in that the storage installation is configured to be adjustable, in particular pivotable, from an upper receiving position for receiving the articles sliding down the chute into a lower discharging position for discharging the received articles, and back again.

The object is furthermore achieved in the case of a storage installation according to embodiments described in the claims in that at least the upper chute is configured according to the above described embodiments, and in that the storage installation of the upper chute is configured to be adjustable, in particular pivotable, from an upper receiving position, assigned to the upper chute, in the direction of the lower chute into a lower discharging position, and back again.

The problem underlying the invention is also achieved according to a method described in the claims for sorting articles, in particular packages and/or consignments, with a sorting installation, preferably a sorting installation comprising at least one chute,
  in which articles to be sorted are transported by at least one transporting device and are sorted at least partially into the at least one chute,
  in which, after sliding down the chute base of the at least one chute, the articles sorted into the at least one chute are received by the storage installation arranged in an upper receiving position,
  in which the storage installation is adjusted, in particular pivoted, from the upper receiving position into a lower discharging position, and
  in which the received articles are removed from the storage installation in the lower discharging position or are transferred to a plant part, in particular a further chute, provided under the storage installation.

The invention has recognized that the chutes of at least one sorting installation can be arranged one above another in a space-saving manner when the at least one upper chute is provided with a vertically adjustable storage installation which, after receiving articles, can be adjusted from the corresponding upper receiving position into a lower discharging position and back again. The adjustment of the storage installation from the upper receiving position into the lower discharging position simplifies the removal of the articles in terms of the design outlay for the sorting installations and in terms of the effort necessary for handling the articles. A suitable lower discharging position can be achieved if necessary by the storage installation being pivoted. In this case, pivoting can take place about a pivot axis or, if necessary, also about several pivot axes simultaneously or in succession. The pivoting of the storage installation can alternatively or additionally allow structurally simple but at the same time highly functional adjustment of the storage installation from the upper receiving position into the lower discharging position and back again.

Here, in the case of a sorting installation, provision is made for the storage installation to be able to be adjusted from an upper receiving position, assigned to the upper chute, in the direction of the lower chute to the lower discharging position. This adjustment of the storage installation can in turn take place, as required, at least partially by the storage installation being pivoted about a pivot axis or several pivot axes, optionally at the same time or in succession. The articles can in this case be removed for example directly from the storage installation in the lower discharging position. This is not necessary, however. The articles can also be transported onwards with the aid of the storage installation, specifically to at least one location at which the actual, in particular manual, removal of the articles takes place. The articles are then thus discharged indirectly via the storage installation in the discharging position. The articles can consequently be discharged from the storage installation first of all to a different plant part of the sorting installation, in particular to another chute. Removal then takes place, as required, from this plant part or from another plant part to which the articles are transferred.

According to the method, the articles are first of all transported in the direction of the at least one chute, in particular in an unsorted manner, via a transporting device, which can preferably be in the form of a belt conveyor or roller conveyor. The articles can in this case be transported directly up to the respective chutes. This is not necessary, however. Between the corresponding chute and the transporting device, it is possible, if necessary, to provide further transporting units which effect and/or guide the transport of the articles from the transporting device to the corresponding chute. The sorting installation in this case comprises means which sort articles into the corresponding at least one chute. Corresponding means, for instance guiding means or flaps, are known from the prior art and can serve to guide and/or push the articles from the transporting device into the chute, for instance by intervening in the transporting route of the articles along the transporting device and counteracting the unimpeded transport along the transporting device.

The articles which are sorted into the at least one chute, for instance because the articles correspond to predetermined criteria, slide down the chute along the chute base of the chute and subsequently arrive at a storage installation which is located in an upper receiving position in which the storage installation receives the articles sliding down the chute base. The articles received by the storage installation remain on the storage installation for a period of time and are accordingly temporarily stored. From the upper receiving position, the storage installation is adjusted into the lower discharging position at a later time. This adjustment can preferably take place by the storage installation being pivoted about a pivot axis or about several pivot axes, optionally simultaneously or in succession. The adjustment of the storage installation from the upper receiving position into the lower discharging position can take place when the storage installation is full. This can be the case for example when the storage installation has received a particular number of articles or the space for receiving further articles has dropped below a limit value. The limit value can in this case be selected such that no more articles can be received or there is only a little space left for receiving further articles. Alternatively or additionally, the storage installation can also be adjusted irrespective of the degree of filling thereof with articles, however, for instance on demand and/or at particular intervals.

After the storage installation has been adjusted into the lower discharging position, the articles are discharged from the storage installation, specifically for example onto a chute provided under the storage installation or onto a different plant part of the sorting installation. If necessary, however, the articles can, alternatively or additionally, also be removed directly from the storage installation in the discharging position.

According to the invention, by way of the storage installation, the adjustment thereof and the integration thereof into the sorting installation, it is possible to connect two or more separate sorting installations to form a common sorting installation. Therefore, not only are sorting installations of the known type arranged one above another, in order to save space, but also additional functionality is ensured, which suits handling and/or the design outlay. Nevertheless, a plurality of transporting devices can be positioned one above another and each transporting device can be assigned the desired number of chutes. As a result of the adaptation of upper chutes, only one common sorting installation is provided, which can, if necessary, have a plurality of transporting devices and chutes, assigned separately to the transporting devices, one above another.

The articles can then optionally be introduced via the upper transporting device or the lower transporting device, wherein the sorting can take place simultaneously in both cases. However, provision can also be made for the articles to successively pass at least in part through the transporting devices in order to be sorted successively in different manners or according to different criteria.

In the following text, for better understanding and in order to avoid unnecessary repetitions, the chute, the sorting installation and the method for sorting articles are described together, without in each case specifically distinguishing precisely between the chute, the sorting installation and the method, since these can be largely configured analogously. It is clear to a person skilled in the art at least from the context, however, which features are in each case preferred for the chute, the sorting installation and the method.

In a first particularly preferred configuration of the chute, the storage installation is vertically adjustable. This does not mean that the storage installation has to be adjustable only vertically. Partially horizontal adjustment is likewise possible, wherein the adjustment in the horizontal direction and the adjustment in the vertical direction can be superimposed or can take place in succession. What is specifically preferred here depends substantially on the transfer, preferred in each case, of the articles by means of the storage installation. This can in turn be influenced by the configuration of the sorting installation and/or by the type of articles themselves. In any event, the storage installation effects downward transport of the articles, however, such that the articles can be removed at a lower level of the sorting installation. In this case, adjustment which is brought about at least in part by pivoting is particularly preferred. This can be achieved in a structurally simple manner and/or can result in preferred transfer of the articles, for instance without the articles being damaged and/or with further transfer means for transferring the articles being saved on.

The pivoting of the storage installation can take place about a single pivot axis, as long as this is sufficient. However, the movement of the storage installation can be adapted more specifically to the desired functionality of the storage installation when the storage installation is pivoted about two or more pivot axes in order to adjust the storage installation from the upper receiving position into the lower discharging position. It may be simple and effective for the rear end, as seen in the transporting direction of the articles along the chute, to be pivotable downwards and back upwards again, specifically for instance about an at least substantially horizontal pivot axis. Alternatively or additionally, however, it is also possible for the front end of the storage installation, as seen in the transporting direction of the articles along the chute, to be pivotable downwards and back upwards again. In this case, too, the pivot axis is preferably oriented at least substantially horizontally. If the storage installation is pivoted about more than one pivot axis, in order to pass from the upper receiving position into the lower discharging position and/or vice versa, the pivoting about the pivot axes can take place at least in part simultaneously or else in succession. In this case, the type of articles can also be taken into consideration and/or the spatial conditions of the sorting installation can be taken into account.

Irrespective of the type of adjustment of the storage installation, it may be preferred for the storage installation to have a plurality of finger elements which are arranged in a distributed manner in the transverse direction of the chute base. The finger elements allow, if necessary, very individual adjustment of the storage installation. Thus, the finger elements can be adjusted independently of one another, at least within particular limits, such that the adjustment can be adapted to particular boundary conditions, as required. For example, individual finger elements can be adjusted less far downwards into the discharging position than other finger elements, in order to prevent the finger elements from coming into contact with plant parts or articles located therebeneath. In this way, damage to the corresponding elements can be avoided. If the storage installation receives articles which differ in terms of their size and/or in some other way, the adjustment of the fingers can be adapted to the articles received. Thus, at some points of the storage installation, significant adjustment may be indicated, while other points of the storage installation should be adjusted less significantly. This can be dealt with individually by the finger elements, as required. It is also possible for the articles to be guided in a direction transversely to the storage installation by means of a plurality of finger elements distributed in the transverse direction of the storage installation. In principle, however, a single finger element can also suffice for a storage installation, for instance in the case of very small articles. By contrast, in the case of relatively large articles, a plurality of finger elements may be appropriate.

The distribution of the finger elements transversely to the chute base does not in this case have to be provided in a uniform manner, even if this is usually preferred for the sake of simplicity. In order to limit the number of finger elements and the transverse extent thereof, and to avoid mutual impairment of the finger elements, the finger elements can be spaced apart from one another in the transverse direction of the chute base. The transverse direction should, if necessary, be understood in particular as being the direction transversely to the transporting direction of the articles along the chute base upstream of the storage installation. Alternatively or additionally, it is appropriate for the finger elements to be directed with their free ends at least counter to the transporting direction of the articles along the chute. In this case, the transporting direction of the articles is in many cases oriented in the longitudinal direction of the chute between the upper end of the chute and the lower end of the chute. It is not absolutely necessary for the finger elements to be directed exactly counter to the transporting direction of the articles. However, the finger elements are preferably directed with their free ends more in this direction than transversely to the transporting direction or in the transporting direction of the articles. As a result of the adjustment of the free ends of the finger elements in the direction of the lower discharging position, it is then possible for a front part of the storage installation to be adjusted downwards. This is preferred in principle for the discharging of the articles in the discharging position.

In this connection, it may be particularly preferred for the free ends of the finger elements to define the front end of the storage installation, as seen in the transporting direction of the articles along the chute. As a result of the adjustment of the fingers, it is thus possible for the front end of the storage installation to be adjusted downwards, which can be advantageous for the transfer of the articles received by the storage installation in the upper receiving position. If this front end of the storage installation is adjusted, in particular pivoted, downwards, the articles can be discharged downwards for example generally counter to the original transporting direction along the upper chute, or slide from the storage installation. In order that the finger elements can also be adjusted together in a simple manner without as a result precluding partial adjustment of finger elements independently of one another, the finger elements can alternatively or additionally be connected at one end to at least one hand element. The hand element can in this case be configured for example as a rod element, bar element or plate element. Alternatively or additionally, the hand element extends at least substantially over the entire width of the storage installation. The ends of the finger elements that are connected to the hand element are in this case located opposite the free ends of the finger elements, such that the finger elements extend from the hand element in the direction of their free ends in a similar manner to a hand. In this way, the free ends can be adjusted with respect to the hand element in the preferred manner described above, wherein superimposed adjustment, if necessary, of the finger elements as a whole is possible via the hand element. It is then alternatively or additionally appropriate, with regard to suitable and functional adjustment of the storage installation, for the hand element to be assigned to the rear end of the storage installation as seen in the transporting direction of the articles along the chute, or to define this rear end.

The free ends of the finger elements can be adjustable in a vertical direction. The adjustment of the storage installation from the upper receiving position into the lower discharging position can then expediently accompany an adjustment of the free ends of the finger elements vertically downwards, and vice versa. The adjustment of the free ends of the finger elements does not necessarily have to take place only vertically in this case, even if this may be preferred, in order to allow simple and precise adjustment of the storage installation between the upper receiving position and the lower discharging position. The adjustment of the finger elements is additionally simplified when the finger elements can be adjusted downwards and/or upwards with respect to the hand element. This applies all the more so for adjustment by pivoting, specifically in particular for the case in which the finger elements are connected at one end to the hand element, with respect to which the finger elements can then be easily pivoted.

Alternatively or additionally, it is also possible for the hand element to be configured to be adjustable in a vertical direction. In this case, too, it is preferred, for expedient adjustment of the storage installation that is easy to execute, for the hand element to be able to be pivoted about at least one pivot axis. The finger elements can, alternatively or additionally, also be configured to be curved in an at least partially vertical direction. The curving of the finger elements can in this case be considered to be pivoting, in particular with respect to the hand element. As a result of the curving, the articles received by the storage installation cannot slide for example accidentally from the storage installation when the storage installation is adjusted from the upper receiving position into the lower discharging position. To this end, the finger elements can be curved upwards, for example. In this case, the finger elements can, if necessary, be curved upwards independently of one another or differently from one another, depending on the received articles. Alternatively or additionally, however, the finger elements can also be curved downwards, for instance when the storage installation is located in the vicinity of the lower discharging device, in order in this way to simplify the discharging of the articles in the lower discharging position. The curving of the fingers downwards can for example result in the articles sliding from the storage installation by themselves. Further means for bringing this about can therefore be dispensed with, if necessary. If necessary, the finger elements can be curved independently of one another or differently from one another, in particular depending on the received articles. It is particularly simple here, under certain circumstances, if the finger elements are connected to a common hand element, for the finger elements to be able to be curved vertically downwards and upwards at least partially with respect to the hand element and stretched again.

A configuration of the finger elements that is favourable for the adjustment, in particular curving, of the finger elements comprises in each case at least two flexible flank elements per finger element that extend jointly in the longitudinal direction of the finger element as far as the free end of the finger element. The flexibility of the finger elements allows the simple adjustment, in particular curving or stretching, of the finger elements. In addition, the flexible flank elements of a finger element are each connected flexibly together, preferably in the longitudinal direction of the finger elements, via a plurality of crosspieces. This allows adjustment, in particular curving, of the finger elements, or the free end thereof, from a lower position into an upper position and back again, which takes place at least partially in the vertical direction, specifically in particular with respect to the hand element. In this way, simple and expedient adjustment of the storage installation is allowed.

In a further preferred configuration of the finger elements, the described configuration allows what is referred to as the fin ray effect, which is observed in the tailfins of bony fish. If a finger is pressed laterally against the tailfin, as a result of the fin ray effect, the tailfin does not curve away, but rather the tailfin bends towards the finger. This is possible on account of the special construction of the tailfin, which is imitated by the finger elements in the above-described configuration. In this connection, the flexible flank elements can be provided for example by flexible flank elements or by link chains made up of rigid chain links that are connected together in a pivotable or articulated manner.

In this case, flexibility is additionally required only in one spatial direction, specifically in particular in the spatial direction in which the curving of the finger elements is intended to take place. Flexibility of the flank elements is not absolutely necessary in the spatial directions perpendicular to this spatial direction. Therefore, the flank elements can also be formed for example in a strip-shaped manner, wherein greater flexural rigidity can arise transversely to the strip. Alternatively, however, a bar-shaped configuration of the flank elements is also possible. The corresponding flexibility of the flank elements allows the finger elements to curve upwards or downwards from a stretched position into a curved position. In this case, the maximum stretched position of the finger elements upon adjustment of the storage installation does not absolutely have to be reached between the upper receiving position and the lower discharging position. Thus, it is possible merely to provide for the upward or downward curving to be strengthened and weakened again upon adjustment of the storage installation. However, provision can also be made for at least some finger elements to be adjusted from an upwardly curved position into a downwardly curved position and back again while the storage installation is being adjusted from the upper receiving position into the lower discharging position and back again.

The structure of the finger elements and the attachment thereof for instance to the hand element can be such that the finger elements are optionally curved further when the articles are received by the storage installation. The articles can then press in the direction of the force of gravity against at least individual finger elements and be curved upwards in the direction of the articles in an analogous manner to the tailfin of the bony fish as a result of the fin ray effect. If the finger elements are attached to a hand element, this results in the hand closing increasingly, if preferably not completely. The articles are in this case held safely in the storage installation, specifically preferably also at least in part during the adjustment of the storage installation from the upper receiving position into the lower discharging position.

In order to provide finger elements which can exhibit the fin ray effect, it is appropriate for the crosspieces and the associated flexible flank elements each to have an acute angle $\alpha$, preferably between 10° and 80°, and an obtuse angle $\beta$, preferably between 100° and 170°. In order that targeted curving of the finger elements can be executed, for instance while the storage element is being adjusted from the upper receiving position into the lower discharging position, the flexible flank elements of the finger elements can each be adjustable with respect to one another in the longitudinal direction of the finger elements, in particular via a drive unit. As a result of the adjustment of the flexible flank elements with respect to one another in the longitudinal direction of the finger elements, the latter can be curved to a greater or lesser extent and/or stretched to a greater or lesser extent, depending on how this is desired during the adjustment of the storage installation from the upper receiving position into the lower discharging position and back again. The adjustment of the flexible flank elements with respect to one another can thus be used to raise and/or lower the finger elements, in particular with respect to the hand element.

The curving of the finger elements can also be used to orient the free ends of the finger elements in a manner aligned with the adjoining chute base in the upper receiving position. This is advantageous in particular when the chute base meets the free ends of the finger elements with an inclination and/or curvature. Then, the chute base can transition into the storage installation with an identical inclination and/or curvature. Ultimately, a continuous course of the curvature or inclination at the transition from the chute base to the storage installation can be provided.

In order to adjust the flexible flank elements of the finger elements, corresponding drive units are appropriate, which are already known per se from the prior art, for instance in the form of linear drives. In order to be able to adjust the finger elements, in particular the free ends thereof, independently of one another, it is furthermore appropriate, if necessary, for different drive units to be assigned to different finger elements. If necessary, for the very flexible and/or individual adjustment of the finger elements, each finger element can be provided with a separate drive unit. In order to reduce the outlay on equipment, however, it is also possible for at least two finger elements to be attached to at least one drive unit for the purposes of adjustment. The assignment of the finger elements to the drive units can in this case be selected as desired and does not have to take place in the same way for all the finger elements. For example, there may be at least one separately adjustable individual finger element, which is attached to a separate drive unit, while a plurality of finger elements are attached to at least one other drive element.

In order that the number of required finger elements transversely to the chute or to the chute base remains manageable and/or that the finger elements do not have to be formed in an excessively wide manner, it is appropriate for the finger elements to carry a flexible material web that bridges the intermediate spaces between the finger elements. In this way, it is possible to prevent articles from passing between the finger elements and blocking the adjustment of the storage installation. The material web can be formed from different materials. The material web should be flexible enough for the finger elements to be able to be adjusted at least in part independently of one another. At the same time, the material web should be rigid enough for the material web not to dip too far into the gaps between the finger elements. In addition, the articles are braked less by smooth material webs than by rough material webs. The desired sliding friction can in this case preferably be chosen in a manner dependent on the arrangement and configuration of the storage installation, in a manner dependent on the articles and/or in a manner dependent on the adjustment of the storage installation from the upper receiving position into the lower discharging position, through a suitable material selection.

Alternatively or additionally, a circulating, if necessary driven, material web can be provided around in each case at least one finger element. The material web can then be configured in a similar manner to a belt of a belt conveyor and, if necessary, likewise be held along the at least one associated finger element. If the material web is driven, specifically preferably in the longitudinal direction of the finger elements, the articles can be slowed down while being received by the storage installation. However, it is also possible to ensure that the articles are received reliably by the storage installation, in particular drawn onto the latter. In order to reduce the outlay on equipment, the material web can circulate around several finger elements. However, alternatively or additionally, provision can be made for at least one material web to circulate exclusively around a single finger element. The corresponding configuration of the storage installation can thus be adapted to the particular requirements.

The adjustment of the storage installation from an upper receiving position into the lower discharging position and back again can take place on the basis of at least one signal from at least one sensor. The at least one sensor can in this case capture whether, how many and/or in what arrangement, articles are provided on the storage installation. Alternatively or additionally, the at least one sensor can capture whether, how many and/or in what arrangement, articles are provided beneath the storage installation, in particular in the chute arranged therebeneath. Thus, for example, damage to the articles is avoided and/or efficient handling of the articles is achieved. Generally speaking, with the aid of the at least one sensor, the filling level of articles on the storage installation and/or therebeneath or in the chutes can be captured, and the adjustment of the storage installation can be controlled on the basis of the at least one filling level. In order to adjust the storage installation from an upper receiving position into the lower discharging position and back again, it is additionally possible to provide a control device and/or a drive device. If necessary, no manual engagement is necessary. The adjustment can take place automatically according to predefined specifications.

With regard to the sorting installation, it is preferred for the storage installation to be configured to be adjustable downwardly in order to discharge the articles from the upper chute into the lower chute. This can take place, if necessary, easily and reliably by the storage installation being pivoted about at least one pivot axis which is preferably oriented at least substantially horizontally. The pivoting can in this case also help the articles to slide into the lower chute from the storage installation in the lower discharging position. Alternatively or additionally, this can also be achieved, however, by the finger elements of the storage installation being adjusted, pivoted and/or curved downwards, as long as the storage installation has corresponding finger elements. In order to avoid damage to the articles or in order to ensure targeted discharging of the articles, the front end of the storage installation, as seen in the transporting direction of the articles along the upper chute, can be adjustable downwards at least substantially as far as the lower chute, in particular as far as the chute base of the lower chute. If necessary, this adjustment, too, can be achieved by the storage installation being pivoted about at least one pivot axis and/or by any finger elements present being adjusted, pivoted and/or curved. The adjustment of the storage installation can take place for example such that, when the storage installation is adjusted from the upper receiving position into the lower discharging position, the articles do not slide downwards along the lower chute or the chute base of the lower chute, for instance into a collecting region of the lower chute. This is achieved, if necessary, by the arrangement of the storage installation relative to the lower chute or to the chute base of the lower chute. Specifically, this arrangement can be selected such that the gap remaining between the chute base and the storage installation does not allow the articles to slide through the gap, although, if necessary, the articles can also be partially supported on the lower chute.

Alternatively or additionally, the rear end of the storage installation as seen in the transporting direction of the articles along the upper chute can be adjustable downwards at least substantially as far as the height of a collecting region, assigned to the end of the lower chute, for articles. The corresponding adjustment of the rear end of the storage installation can take place after or least in part parallel to the adjustment of the front end of the storage installation in the direction of the lower chute, wherein the front end of the storage installation can, if necessary, be adjusted downwards until the articles are discharged into the lower chute. As a result of the rear end of the storage installation being lowered to the level of the lower chute, in particular to the level of the collecting region for articles of the lower chute, it is possible to ensure that the articles can be removed easily from the storage installation. Thus, the articles are then preferably not transferred completely to the lower chute. In an intermediate position, the articles can be held by the lower chute and the storage installation, in particular the front end of the storage installation, however. Subsequently, the articles preferably slide rearwards along the storage installation, for instance in the direction of the hand element. The adjustment of the rear end of the storage installation can, in this case, too, be brought about, for the sake of simplicity, by the rear end of the storage installation, if necessary of the hand element, being pivoted.

In order to achieve a high throughput of articles which can be sorted by the sorting installation per unit time, it is appropriate for the upper chute to adjoin, with an upper end, an upper transporting device for articles to be sorted. Alternatively or additionally, the lower chute can adjoin, with an upper end, a lower transporting device for articles to be sorted. If necessary, the sorting installation can thus have two transporting devices for introducing articles to be sorted, which can be sorted at least in part independently of one another and/or parallel to one another into the at least one upper chute and the at least one lower chute. For the purposes of sorting, it is appropriate for a plurality of lower chutes assigned to the lower transporting device and a plurality of upper chutes assigned to the upper transporting device to be provided. The upper chutes can in this case each be equipped, if necessary, with a storage installation as described, which can be adjusted downwards from the upper receiving position, associated with the respective upper chute, in the direction of the lower chute into a lower discharging position. Alternatively or additionally, the transporting devices can be configured as belt conveyors having a circulating belt and/or as roller conveyors.

According to the method, it is otherwise preferred if, when the storage installation is adjusted from the upper receiving position into the lower discharging position, a plurality of finger elements of the storage installation are curved downwards. In this way, the storage installation can be adjusted downwards easily. Alternatively or additionally, the articles can be discharged easily and reliably by the corresponding curving of at least some finger elements. If necessary, the articles thus slide down from the storage installation more easily. In this case, the finger elements can alternatively or additionally be curved downwards or upwards in the upper receiving position and/or during the adjustment of the storage installation, for instance in order to prevent articles from sliding down accidentally from the storage installation or to keep the articles safely on the storage installation. The curving of the finger elements downwards and/or upwards is in this case brought about for example easily and precisely by flank elements of the finger elements being adjusted with respect to one another, to which end at least one drive unit is connected to at least one finger element.

The adjustment or lowering of the storage installation, in particular of the front end of the storage installation and/or the free ends of the finger elements of the storage installation, in the direction of the lower discharging position at least substantially as far as the chute base of the lower chute provided under the upper chute, has been found to be particularly expedient for organized discharging of the articles from the storage installation in the lower discharging position. In this case, the minimum spacing between the storage installation, the front end of the storage installation and/or the free ends of the finger elements of the storage installation, on one side, and the chute base of the lower chute can be less than the height of the articles received by the storage installation. In this way, it is possible for the articles not to slide down the chute base of the lower chute but rather to be held at least in part by the storage installation. In order to remove the articles from the storage installation, the rear end thereof can subsequently be lowered, if necessary further, downwards. In this case, the articles can optionally remain on the storage installation or pass, in particular slide, over the rear end of the storage installation into the lower chute, wherein the former may be preferred in order to avoid damage to the articles.

Alternatively or additionally, the storage installation, in particular the rear end of the storage installation and/or the hand element of the storage installation, can be lowered at least substantially onto a collecting region, assigned to the rear end of the lower chute, of the lower chute when the storage installation is adjusted into the lower discharging position. The collecting region of the lower chute is in this case arranged preferably at a level at which the articles can easily be removed from the lower chute. If the storage installation is then lowered in the described manner approximately to the level of the collecting region of the lower chute, this likewise allows easy removal of the articles, for instance by hand, specifically from the storage installation in the lower discharging position.

In this case, the minimum spacing between the storage installation of the upper chute, in particular the rear end of the storage installation and/or the hand element of the storage installation, on one side, and the collecting region of the lower chute, on the other side, can be less than the height of the articles received by the storage installation. This has the advantage that the storage installation can be adjusted a very long way downwards in the direction of the collecting region of the lower chute, such that the articles can be removed easily from the storage installation. It should then be ensured that, when the storage installation is adjusted from the upper receiving position into the lower discharging position, no articles are located in the collecting region of the lower chute, in order that no articles are damaged. However, it is also possible for a minimum spacing to be provided between the storage installation of the upper chute, in particular the rear end of the storage installation and/or the hand element of the storage installation, on one side, and the collecting region of the lower chute, said minimum spacing being greater than the height of the articles, specifically in particular the articles located in the collecting region of the lower chute. In this way, damage to articles present in the collecting region of the lower chute can be prevented. The articles can then still be removed from the storage installation of the upper chute with reasonable effort, however.

BRIEF DESCRIPTION OF THE SEVERAL VIEWS OF THE DRAWING

The invention is explained in more detail in the following text with reference to a drawing, which illustrates merely exemplary embodiments and in which.

DETAILED DESCRIPTION OF THE INVENTION

Figure 1A:
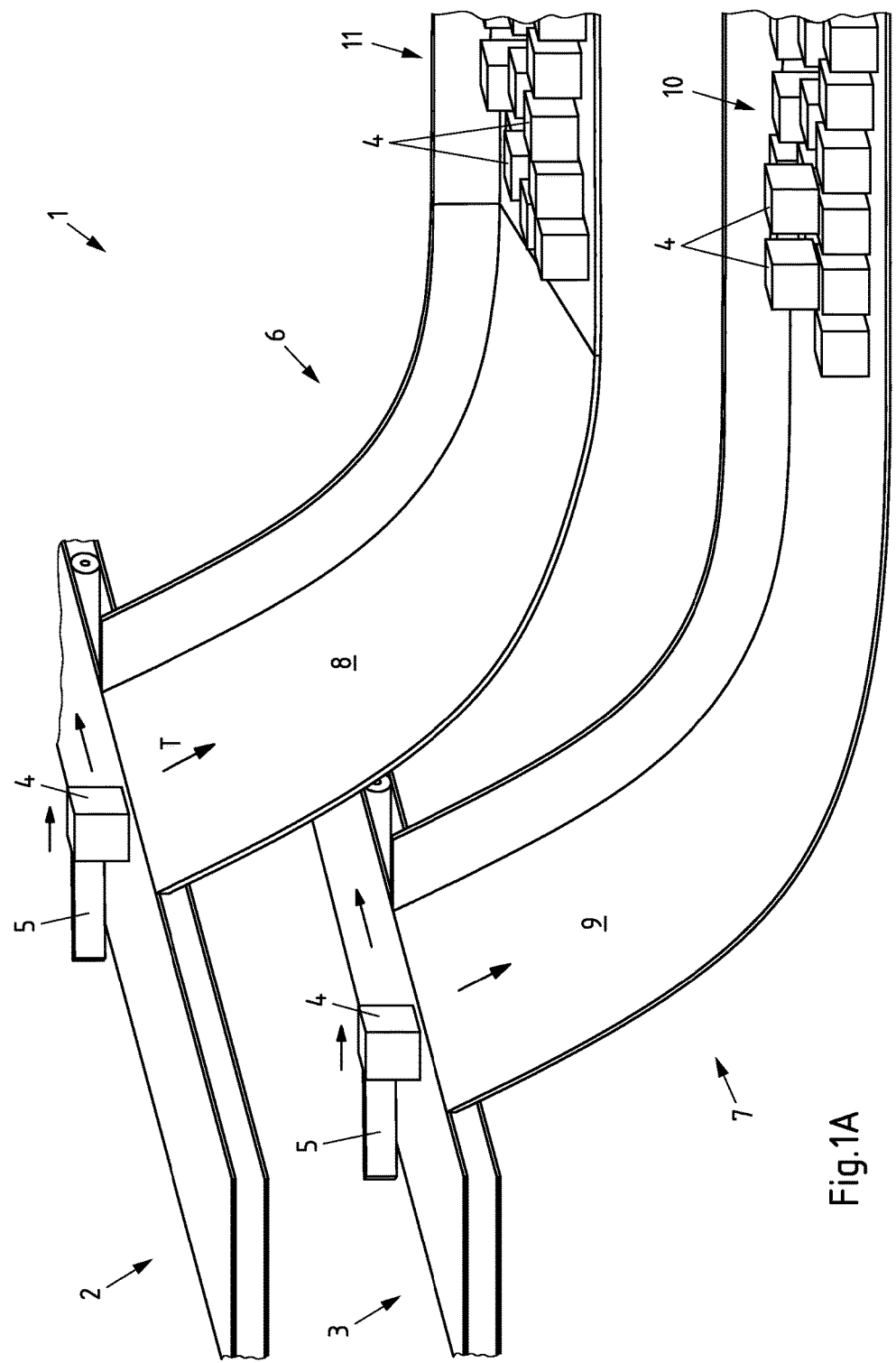
FIGS. 1A-B show a perspective sectional view and a side sectional view of a detail of a sorting installation according to the invention having a chute according to the invention for executing the method according to the invention.
Figure 1B:
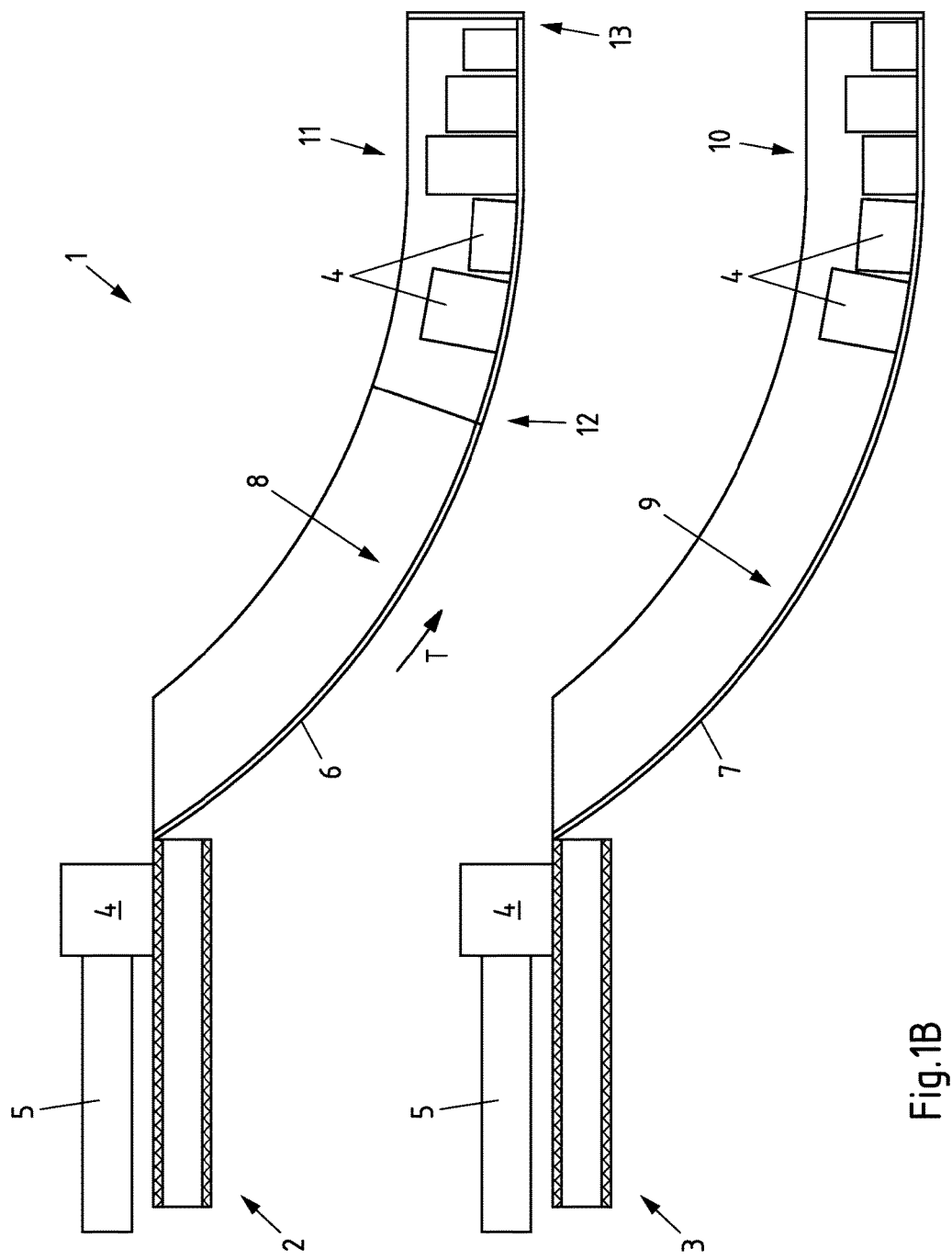

FIGS. 1A-B illustrate part of a sorting installation 1 which has two transporting devices 2, 3 arranged one above the other. Each of the transporting devices 2, 3 is configured as a belt conveyor in the sorting installation 1 that is illustrated and to this extent preferred. The transporting devices 2, 3 serve to transport articles 4 to be sorted. The articles 4 are, as is known in principle from the prior art, sorted according to predetermined criteria. To this end, if necessary, at least one, in particular optical, sensor can be provided, which captures particular parameters, for example in the form of barcodes, of the articles 4. The parameters can then be compared with the predetermined criteria. On the basis of the comparison, the articles 4 are then guided or pushed into corresponding chutes 6, 7 from the transporting device 2, 3 via guiding devices 5, which are configured in the form of flaps in the sorting installation 1 that is illustrated and to this extent preferred. In this case, each transporting device 2, 3 is successively assigned a series of chutes 6, 7, which each receive particular groups of articles 4 which differ with regard to the predetermined criteria. Subsequently, the articles 4 are transported along the series of chutes until the articles 4 have arrived at the chute into which the articles 4 are intended to be guided on the basis of the predetermined criteria, this being brought about by the engagement of a corresponding guiding device 5.

The articles 4 are in particular packages, which in turn preferably represent parcels. They are thus primarily parcels and packets for sending to addressees. The sorting installation 1 is in this case preferably part of a distribution centre, to which parcels are delivered, sorted and, after being sorted, transported onwards in groups, in order ultimately for the articles 4 to be delivered to the addressee. Therefore, sorting can take place according to address features, for instance the postal code, the street or the addressee themselves. In the present case, however, it can also be a sorting installation 1 of a warehouse, in which articles 4 in the form of goods are sorted in order to be transported together to a different location. The sorting installation 1 can also be downstream of at least one production plant, however, in order to sort the produced products for a subsequent use thereof.

Once the articles 4 have been ejected into the chutes 6, 7 provided therefor, the articles 4 slide down the chute bases 8, 9 of the corresponding chutes 6, 7 in the direction of the end of the chute 6, 7. The longitudinal extent of the chutes 6, 7 is in this case preferably arranged transversely to the longitudinal extent of the transporting devices 2, 3 for reasons of space. In this case, the chutes 6 assigned to the upper transporting device 2 are arranged above the lower chutes 7 assigned to the lower transporting device 3 in the sorting installation 1 that is illustrated and to this extent preferred. Articles 4 which have been guided or ejected into the lower chutes 7 slide down the chute bases 9 and arrive, at the end of the chutes 7, in collecting regions 10 of the chutes 7, in which the articles 4 accumulate and are kept until the articles 4 are removed from the collecting regions 10 of the lower chutes 7, in particular by hand.

In the upper chutes 6, the articles 4 slide down the chute bases 8 in order to be collected by a storage installation 11 at the end of the chute 6, said storage installation 11 to this end being located in an upper receiving position. If necessary, further articles 4 are gradually received by the storage installation 11. The corresponding articles 4 are in this case temporarily stored in the storage installation 11 for a period of time, specifically for example until the storage installation 11 is full or until the articles 4 are intended to be removed from the sorting installation 1. To this end, the storage installation 11 can be adjusted from the upper receiving position into a lower discharging position. If the storage installation 11 is arranged in the lower discharging position, the previously received articles 4 can be removed more easily, in particular by hand, from the storage installation 11 since the latter is arranged lower and is more easily reachable.

However, alternatively, the storage installation 11 can also be adjusted into the lower discharging position such that the articles 4 are discharged from the storage installation 11 to further plant parts of the sorting installation 1, in particular to the chute 7 provided under the storage installation 11.

Then, the articles 4 can be removed for example from the collecting region 10 of the lower chute 7. In this case, articles 4 from the upper chute and articles 4 from the lower chute 7 can be combined. However, provision can also be made for the articles 4 from the upper chute 6 to be passed on into the lower chute 7 only when there are no further articles 4 in the lower chute 7, in order to avoid undesired mixing of articles 4 which belong to different groups of articles 4 on the basis of predetermined criteria. Because of this problem, it is in principle preferred for the articles 4 to be removed directly from the storage installation 11 located in the lower discharging position and for the articles 4 not to be discharged into the lower chute 7.

Figure 2A:
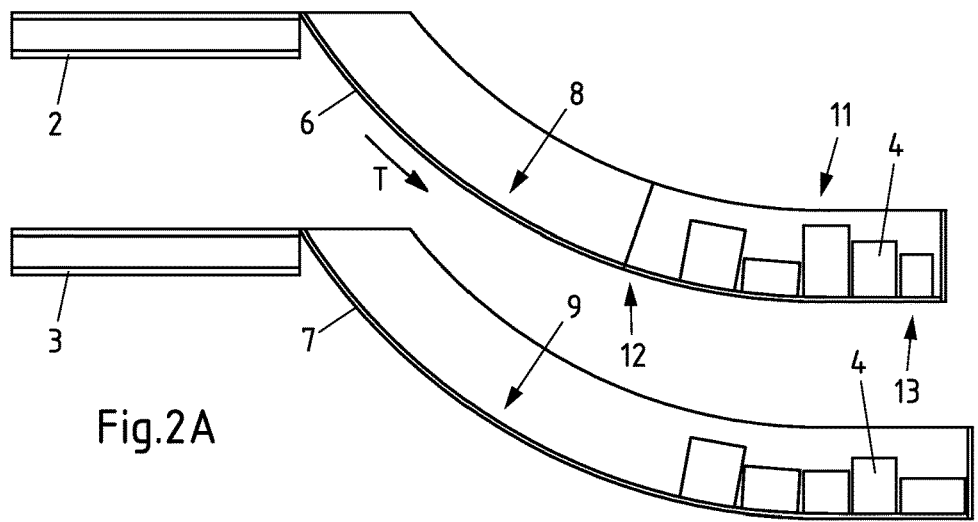
FIGS. 2A-C show schematic sectional views of a storage installation of the chute from FIG. 1.
Figure 2B:
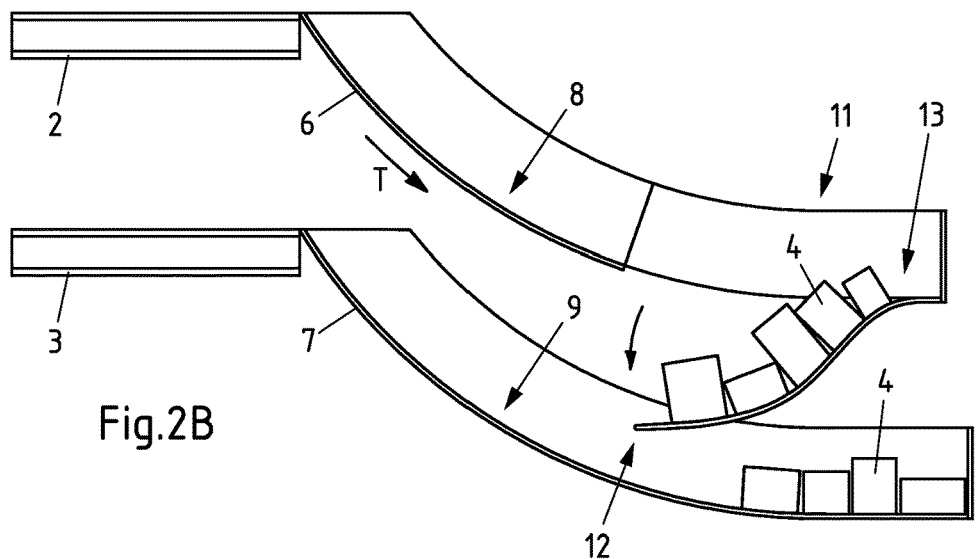
Figure 2C:
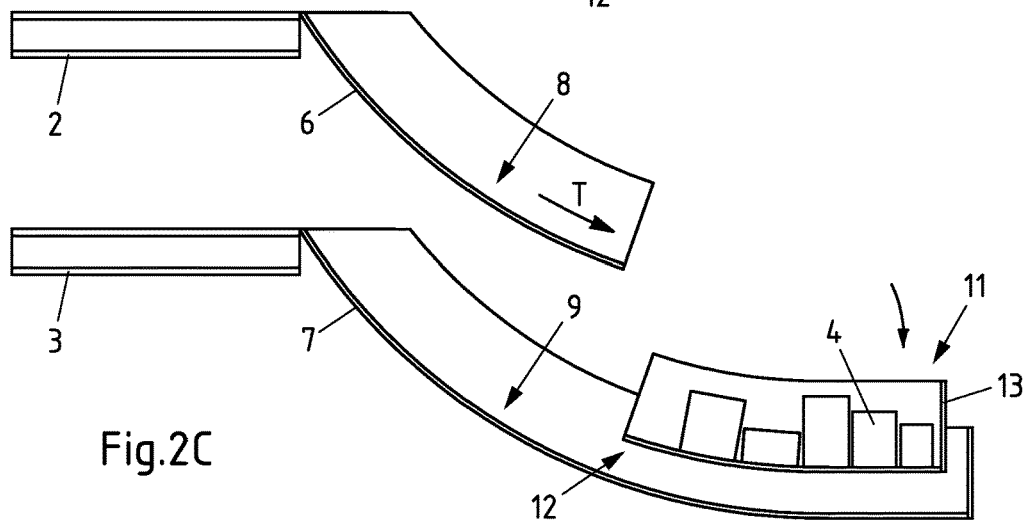

In the sorting installation 1 that is illustrated and to this extent preferred, the storage installation 11 is adjusted as illustrated schematically in FIGS. 2A-C. First of all, the storage installation 11 is in the upper receiving position, as is the case in FIG. 2A. In this case, as illustrated, the storage installation can be adapted to the contour of the chute base 8 of the upper chute 6 and, if necessary, itself be curved. From the upper receiving position, the front end 12 of the storage installation 11, as seen in the transporting direction T of the articles 4 along the upper chute 6, is pivoted downwards in the direction of the lower chute 7, as is illustrated in FIG. 2B. In the sorting installation 1 that is illustrated and to this extent preferred, the pivoting is stopped before the storage installation 11 comes into abutment against the lower chute 7, although this does not absolutely have to be the case. In the present case, the front end 12 of the storage installation 11 has only been pivoted downwards to such an extent that the articles 4 are held safely by the storage installation 11 and do not accidentally slide down from the storage installation 11 into the lower chute 7. In a next, or at least partly parallel, step, the rear end 13 of the storage installation 11, as seen in the transporting direction T of the articles 4 along the upper chute 6, is pivoted downwards, but, if necessary, without coming into contact with the lower chute 7, in order not to damage articles 4 arranged there. Nevertheless, the rear end 13 of the storage installation 11, as illustrated in FIG. 2C, is pivoted downwards to such an extent that the articles 4 can be removed easily, in particular by hand, from the storage installation. 11. Once the articles 4 or individual articles 4 have been removed, the storage installation 11 is adjusted back up into the receiving position, in the reverse order.

The storage installation 11 of the at least one chute 6 can, in principle, also be adjusted in some other way, however. Thus, rather than the storage installation 11 being pivoted about at least one pivot axis, linear adjustment of the storage installation 11 in the vertical direction is in principle also possible. Alternatively or additionally, the vertical adjustment of the storage installation 11 can also accompany a horizontal adjustment of the storage installation 11, for example in order to further simplify the removal of the articles 4 from the storage installation 11.

The adjustment of the storage installation 11 from an upper receiving position into the lower discharging position and back again can take place on the basis of at least one signal from at least one sensor (not illustrated). In this case, the at least one sensor can capture for example whether, how many and/or in what arrangement articles 4 are provided on the storage installation 11. Alternatively or additionally, the at least one sensor can capture whether, how many and/or in what arrangement articles 4 are provided beneath the storage installation 11, in particular in the chute 7 arranged therebeneath. If necessary, with the aid of the at least one sensor, the filling level of articles 4 on the storage installation 11, therebeneath and/or in at least one chute 6, 7 can be captured and the adjustment of the storage installation 11 can be controlled on the basis of the at least one filling level, to which end a corresponding control device and/or a corresponding drive device can be provided.

Figure 3:
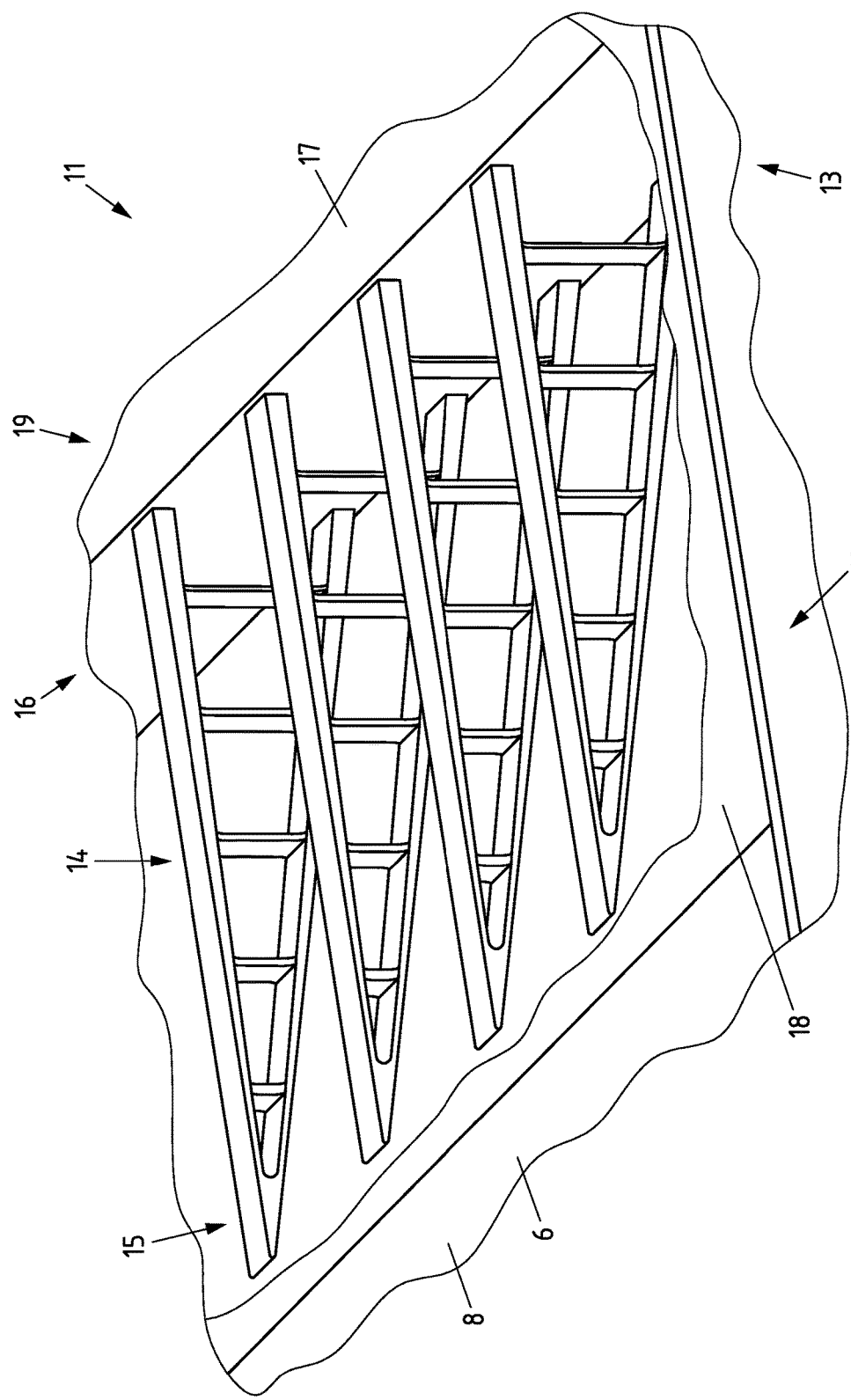
FIG. 3 shows a perspective sectional view of a detail of a storage installation of the sorting installation from FIG. 1.

As reproduced by way of example in FIG. 3, in the sorting installation 1 that is illustrated and to this extent preferred, the storage installation 11 has a series of finger elements 14 that are distributed transversely to the chute 6 and are arranged in a manner spaced apart from one another. The finger elements 14 have free ends 15 which define the front end 12 of the storage installation 11. The rear ends 16 of the finger elements 14 are attached to at least one hand element 17, which is configured in the form of a strut in the present case. In this case, like the finger elements 14, the hand element 17 carries a material web 18 which extends at least substantially over the entire top side of the storage installation 11 and supports the articles 4 received by the storage installation 11. The material web 18 prevents the storage installation 11 from being blocked by intervention in the intermediate spaces between the finger elements 14. In the storage installation 11 that is illustrated and to this extent preferred, the finger elements 14 are curved upwards slightly in the receiving position, in order to match the contour of the chute 6. Thus, a continuous course of the contour along the chute base 8 of the upper chute 6 and of the storage installation 11 can be achieved. In order to adjust the finger elements 14, in particular to curve the finger elements 14, the latter are provided with at least one drive unit 19 (not illustrated in detail). The latter can act on all the finger elements 14, individual finger elements 14 or on only one finger element 14, depending on how necessary this appears to be. The drive units 19 can be known drives such as linear drives and are therefore not illustrated for the sake of clarity.

As a result of the at least one drive unit 19, the finger elements 14 can be curved upwards and downwards, specifically with respect to the hand element 17. This ultimately results in the front end 12 of the storage installation 11 being pivoted upwards or downwards. Upwardly curved finger elements 14 can be used to prevent the received articles 4 from sliding down forwards from the storage installation 11 and/or to allow the articles 4 to slide rearwards in a targeted manner in the direction of the hand element 17. It is likewise possible to curve the finger elements 14 downwards in order, if necessary, to discharge the articles 4 onto the lower chute 7 in the discharging position, if this is desired. When at least individual finger elements 14 can be adjusted or curved independently of one another, the adjustment of the finger elements 14 can be adapted to the articles 4 received by the storage installation 11 or to the articles 4 located under the storage installation 11 in the lower chute 7, for instance in order to avoid damage to the articles 4.

Figure 4:
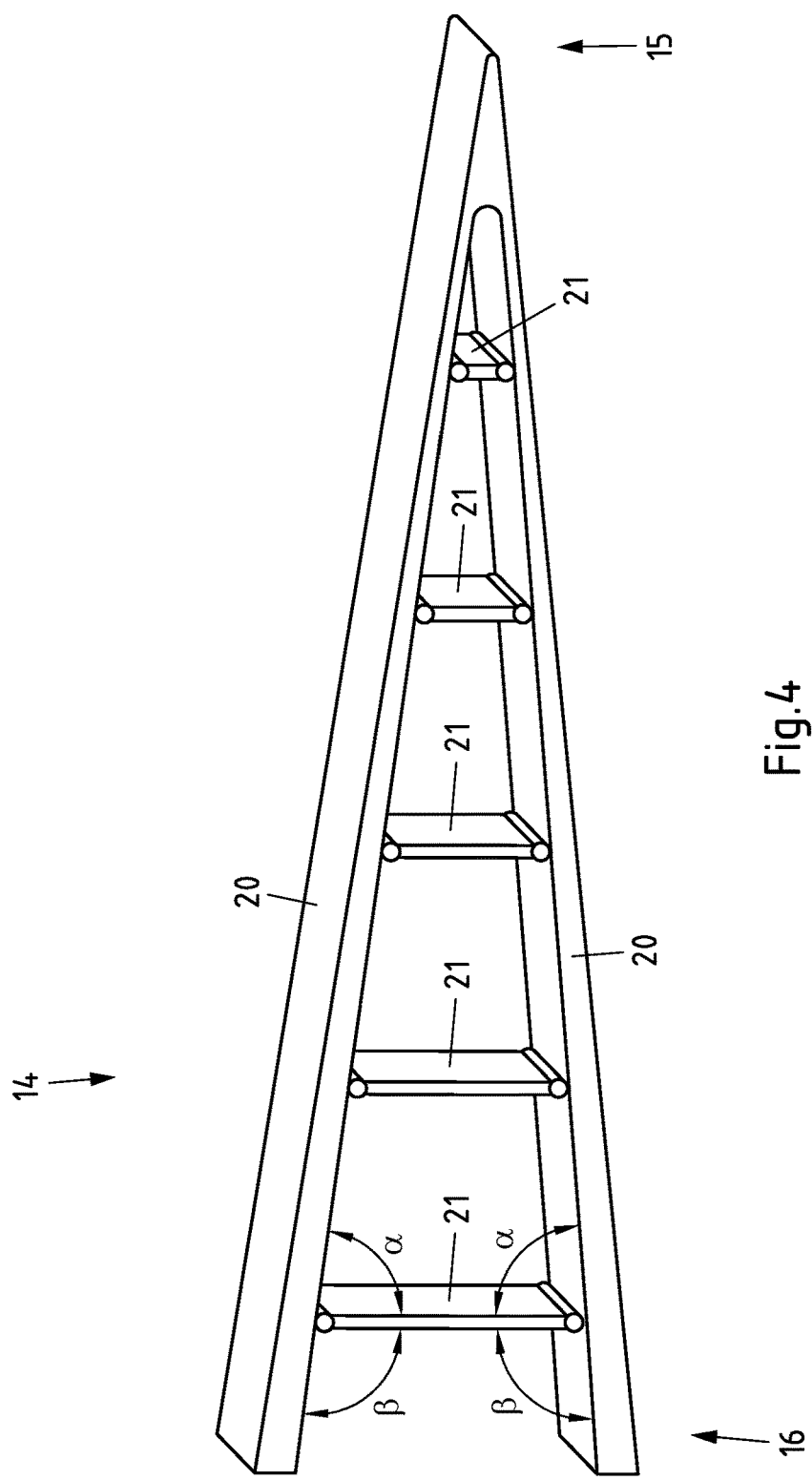
FIG. 4 shows a perspective side view of a finger element of a guiding device of a chute according to the invention.

FIG. 4 illustrates a finger element 14 of a storage installation 11 of a chute 6. The finger element 14 comprises two flank elements 20 which, in the finger element 14 that is illustrated and to this extent preferred, extend jointly from a rear end 16, illustrated on the left and connected to the hand element 17, of the finger element 14 to the opposite free end 15, illustrated on the right, of the finger element 14. In this case, the flank elements 20 approach one another continuously in the direction of the free end 15, until, in the finger element 14 that is illustrated and to this extent preferred, the flank elements 20 transition into one another at the free end 15 of the finger element 14. Therefore, a conically tapering finger element 14 that narrows in one direction is obtained. Crosspieces 21 are provided between the flank elements 20 in a manner distributed along the length of the finger element 14, the flank elements 20 being connected together via said crosspieces 21. In the finger element 14 that is illustrated and to this extent preferred, the crosspieces 21 are each connected in a pivotable manner, in particular in an articulated manner, at their opposite ends to the flank elements 20. Alternatively, the crosspieces 21 could be configured in a flexible manner, in order to allow the crosspieces 21 to move with respect to the flank elements 20. In the finger element 14 that is illustrated and to this extent preferred, the crosspieces 21 are distributed at regular spacings along the length of the finger element 14. This is not absolutely necessary, however. It is also preferred, merely for the sake of simplicity, for the crosspieces 21 to extend parallel to one another. However, it is particularly expedient for the crosspieces 21 to form an acute angle α with each of the flank elements 20 on one side and an obtuse angle β on the opposite side.

Figure 5A:
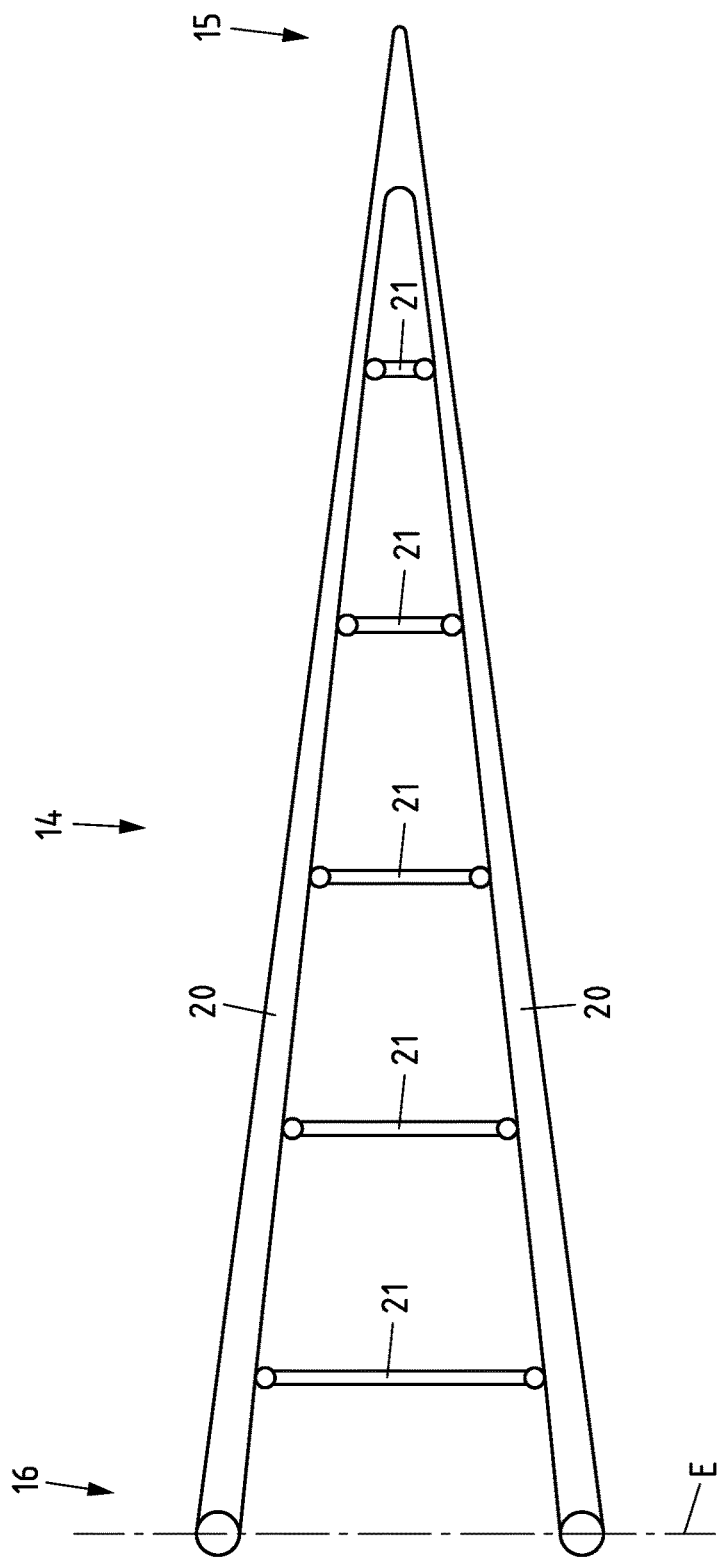
FIGS. 5A-C show perspective side views of the vertical adjustment of the finger element from FIG. 5.
Figure 5B:
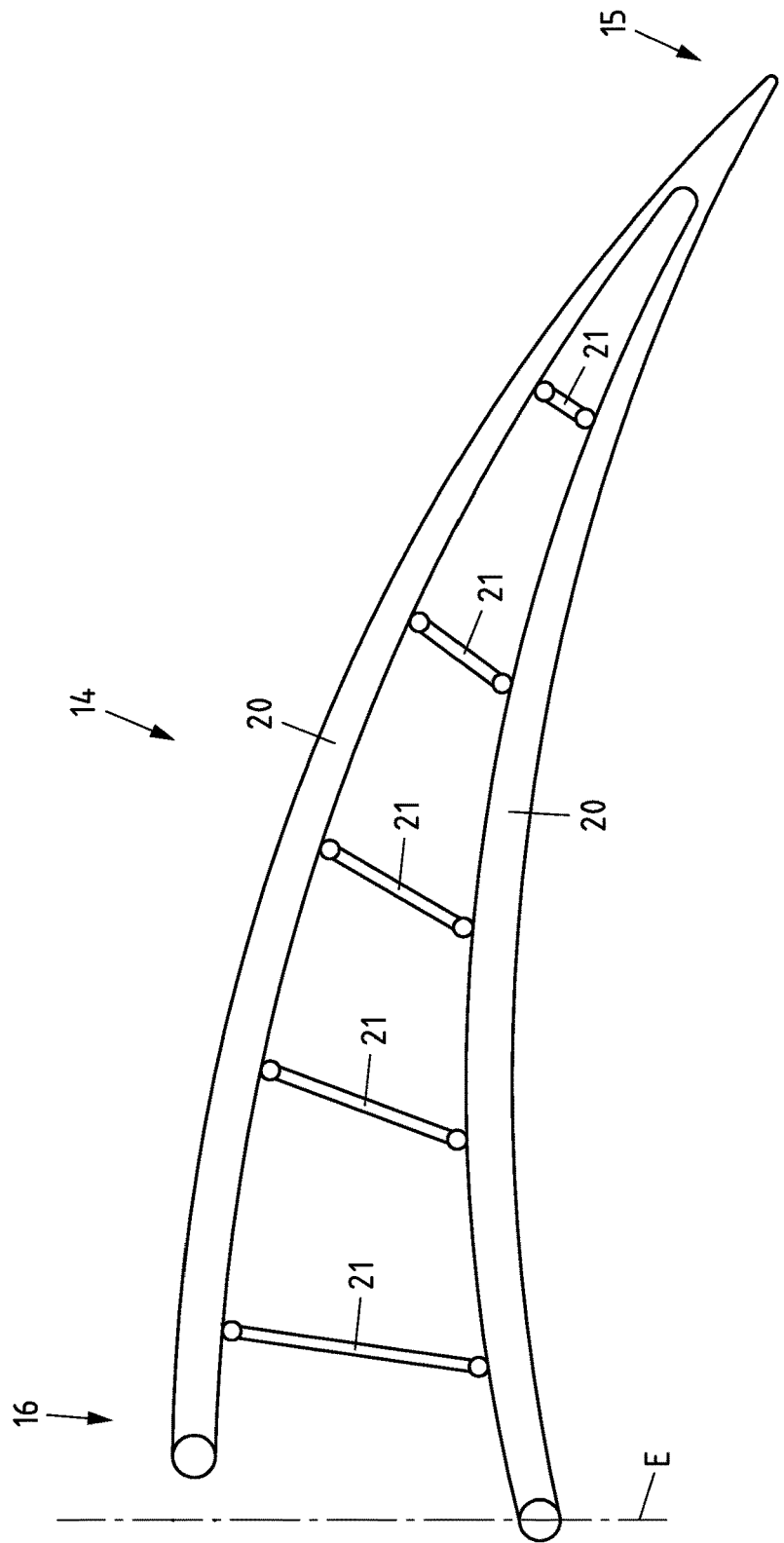
Figure 5C:
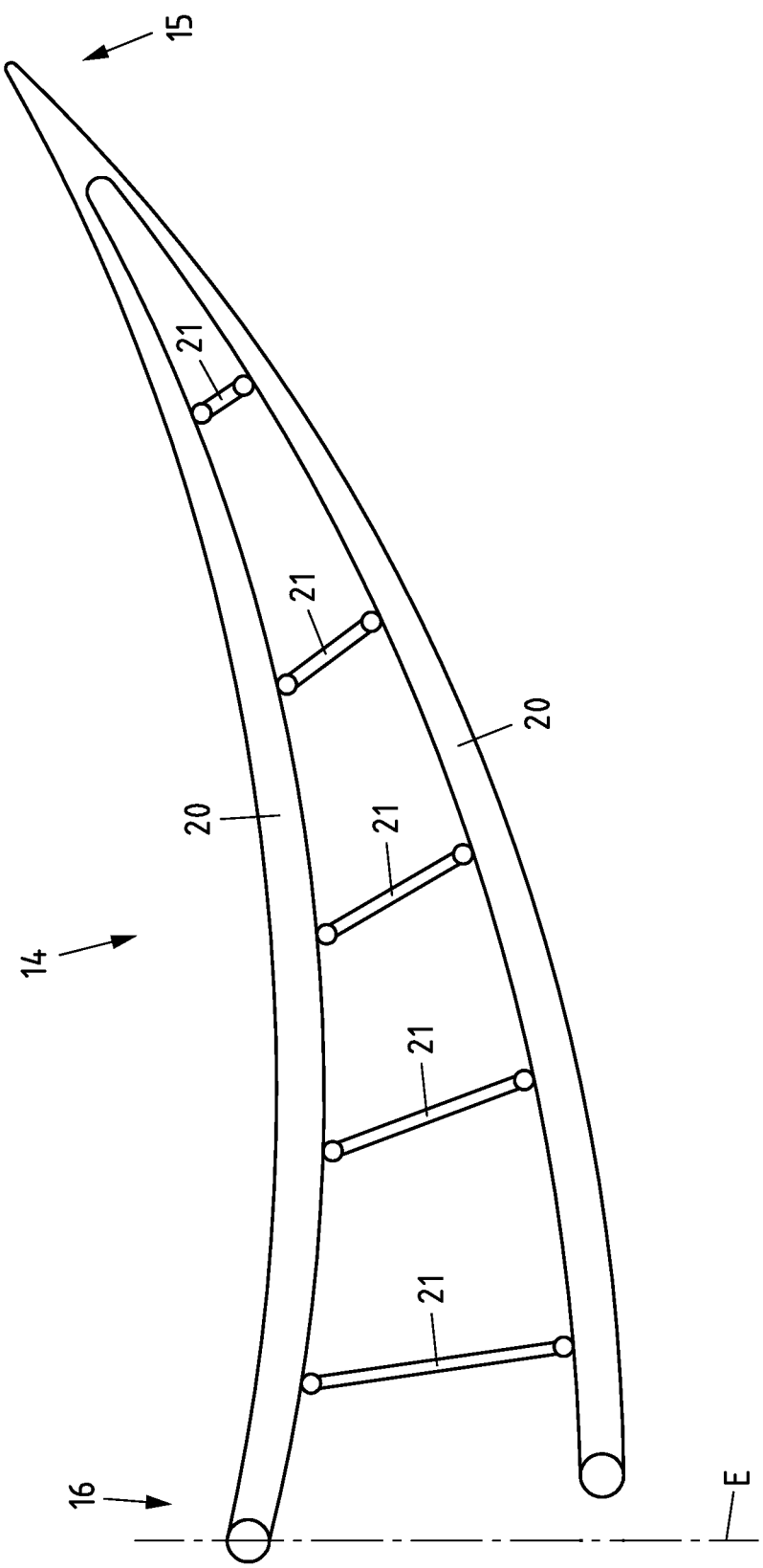

The flank elements 20 that are illustrated and to this extent preferred are configured in a flexible manner, such that the flank elements 20 can be bent, wherein the finger element 14 is curved to a greater or lesser extent, this being illustrated in particular in FIGS. 5A-C. As a result of the finger elements 14 being curved, the free ends 15 of the finger elements 14 are moved in particular upwards or downwards. This ultimately results in a vertical adjustment of the finger elements 14 as a whole or in the finger elements 14 being pivoted, in particular about the hand element 17, which can in turn be arranged in a pivotable manner on the chute 6. To this end, the flank elements 20 can be formed for example from a metal or a plastics material. The same goes for the crosspieces 21, which do not have to be configured in a flexible manner, however.

In FIG. 5A, the finger element 14 from FIG. 4 is illustrated in a stretched orientation, in which the ends of the flank elements 20 are arranged in a plane E. In the finger element 14 that is illustrated and to this extent preferred, the flank elements 20 are formed at least substantially symmetrically to one another in this position. If, according to FIG. 5B, the upper flank element 20 is moved in the direction of the free end 15 of the finger element 14 with respect to the plane E, the finger element 14 is curved or pivoted downwards. In other words, the finger element 14 is adjusted downwards, wherein a finger element 14 can be adjusted downwards or upwards, preferably as a whole, if necessary without being curved. The curving of the finger element 14 that is illustrated and to this extent preferred results from the flexibility of the flank elements 20 and of the pivotable connections between the flank elements 20 and the crosspieces 21 provided therebetween. In this case, it should be noted that the flank elements 20 do not absolutely have to be configured in a flexible manner along their entire longitudinal extent, even if this is often preferred. It is also conceivable for the flank elements 20 to have rigid portions which are connected together in a pivotable, in particular articulated, manner, preferably by way of a hinge. In this case, corresponding flank elements 20 should have at least one pivoting connection between two crosspieces 21.

According to FIG. 5C, the finger element 14 is curved upwards in an analogous manner when the lower flank element 20 is moved forwards in the direction of the free end 15 of the finger element 14 with respect to the plane E. In this way, adjustment of the free end 15 of the finger element 14 or pivoting of the finger element 14 downwards can thus be achieved.

It can furthermore be gathered from FIGS. 5A-C that the crosspieces 21 between the flank elements 20 are inclined in opposite directions during the curving of the finger element 14, when the finger element 14 is adjusted upwards and downwards. In order to adjust the flank elements 20 in an analogous manner to FIGS. 5A-C, a drive unit 19 (not illustrated) can be provided. In this case, suitable drive units 19, for instance linear drives, are known from the prior art. It is also not illustrated that more than two, for example at least three or four, flank elements 20 can be provided, for instance in order not only to adjust the finger element 14 for example up and down, but also to the side. For the sake of simplicity, these are then arranged in a manner distributed, in particular regularly, about a longitudinal axis of the finger element 14. The plurality of flank elements 20 can then taper, in particular with free ends 15, at a common tip of the finger element 14. In addition or alternatively, the crosspieces 21 can preferably each connect all the flank elements 20 together. The flank elements 20 that are illustrated and to this extent preferred are configured in a strip-shaped manner. However, a plate-shaped or bar-shaped configuration of the flank elements would also be possible, as long as the flank elements allow the flank elements to move and curve with respect to one another.

Figure 6:
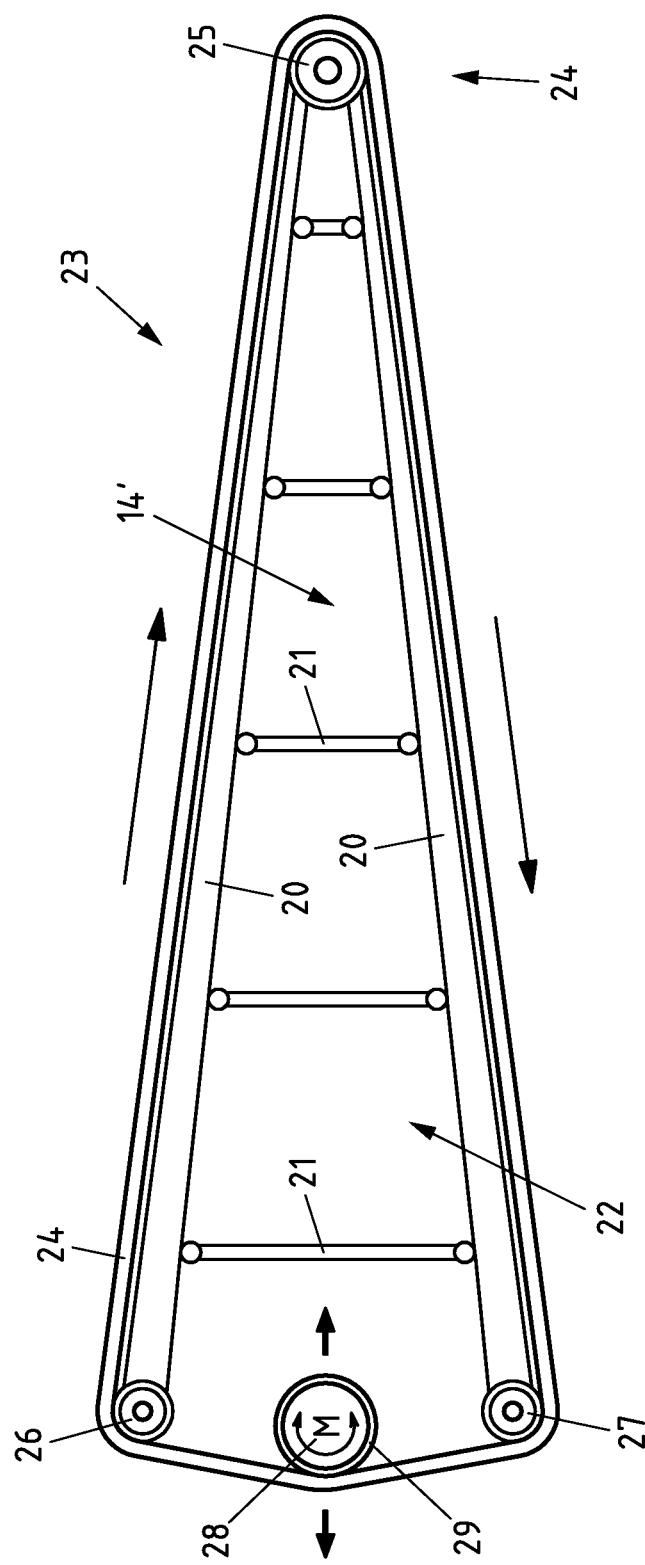
FIG. 6 shows a perspective side view of an alternative finger element of a guiding device of a chute according to the invention.

FIG. 6 illustrates a finger element 14' as part or in the form of a belt conveyor 23, wherein the finger element 14' forms the load-bearing structure 22 of the belt conveyor 23 in the embodiment that is illustrated and to this extent preferred. The finger element 14' is in this case configured generally in an analogous manner to the finger element 14 illustrated in FIG. 1. Therefore, the belt conveyor 23, in particular the free end 24 of the belt conveyor 23, can be adjusted upwards and downwards. The belt 24 that circulates around the finger element 14' along the flank elements 20 in this case follows the adjustment, in particular the curving, of the finger element 14' upwards and downwards. In this case, the belt 24 circulates endlessly around the load-bearing structure 22 and thus around the finger element 14'. To this end, the finger element 14' that is illustrated and to this extent preferred has a plurality of deflections in the form of deflection rollers 25, 26, 27. One deflection roller 25 is arranged at the free end 15 of the finger element 14' and in each case one further deflection roller 26, 27 is arranged at the opposite ends of the flank elements 20. The deflection rollers 25, 26, 27 are in this case carried by the load-bearing structure 22 of the finger element 14'. In order that the belt 24 is guided close to the upper flank element 20 or to the two flank elements 20, as required, even in the case of a curved finger element 14', the belt 24 can be held at at least one point on at least the upper flank element 20 via suitable connecting means.

The belt 24 of the finger element 14' can be driven by the weight force acting on an article 4 located on the finger element 14', in order to improve the transport of the article 4 along the finger element 14'. However, a motorized drive of the belt 24 can also be provided, in order to forcibly drive the belt 24 and to transport the articles in the desired direction and/or at the desired speed. The drive 28 acts on the belt 24 via a drive roller 29, which can be adjusted for example in the longitudinal direction of the finger element 14', if necessary, in order to tension the belt 24. In addition, in order for the belt 24 to be driven in as slip-free a manner as possible, corresponding toothings, which mesh with one another, can be provided on the belt 24 and on the drive roller 29. In contrast to the illustration in FIG. 6, the load-bearing structure of the finger element can have further components, if necessary.

The belt 24 of the belt conveyor 23, whether it is driven by a motor or not, can, if necessary, circulate only around one finger element 14', wherein, if necessary, each finger element 14' can then have a separate belt 24. Thus, the articles 4 can be steered very flexibly and in different manners at different points of the storage installation. However, the outlay on equipment and control technology is then generally higher. By contrast, it is simpler in terms of equipment and control technology for at least one belt 24 to extend transversely to the chute 6 over a plurality of finger elements 14' arranged alongside one another and also to circulate around this plurality of finger elements 14'. If necessary, it is also possible for a single belt 24 to circulate around all the finger elements 14' of a storage installation and in the process to cover the gaps between the finger elements 14'.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chute for articles, in particular packages and/or consignments, having a chute base for the article to slide down, having at least one storage installation, preferably assigned to the lower end of the chute, for the articles that have slid down along the chute base,
    wherein the storage installation is configured to be adjustable, in particular pivotable, from an upper receiving position for receiving the articles sliding down the chute into a lower discharging position for discharging the received articles, and back again;
    wherein the storage installation has, transversely to the chute base, at least one finger element, in particular a plurality of finger elements that are preferably spaced-apart from one another, and preferably in that the free ends of the finger elements are directed at least partially counter to the transporting direction of the articles along the chute base;
    wherein the finger elements each have at least two flexible flank elements that extend jointly in the longitudinal direction of the finger element as far as the free end of the finger element, and in that the flexible flank elements are each connected flexibly together in the longitudinal direction of the finger elements via a plurality of crosspieces, such that the free ends of the finger elements can be adjusted from a lower position into an upper position and back again, preferably curved in a vertical direction, in particular with respect to the hand element.

2. The chute according to claim 1, wherein the storage installation, preferably the rear end and/or front end of the storage installation, as seen in the transporting direction of the articles along the chute, is vertically adjustable, preferably pivotable about at least one pivot axis, in particular one after the other.

3. The chute according to claim 1, wherein the crosspieces and the associated flexible flank elements each have an acute angle α, preferably between 10° and 80°, and an obtuse angle β, preferably between 100° and 170°, and/or in that the flexible flank elements of the finger elements are each adjustable with respect to one another in the longitudinal direction of the finger elements, in particular via a drive unit, such that the finger elements are curved to a greater or lesser extent with respect to one another by adjustment of the flexible flank elements.

4. The chute according to claim 1, wherein the free ends of the finger elements define the front end of the storage installation, as seen in the transporting direction of the articles along the chute, and/or in that the finger elements are connected at one end to at least one hand element, and, preferably, in that the hand element defines the rear end of the storage installation, as seen in the transporting direction of the articles along the chute.

5. The chute according to claim 4, wherein the free ends of the finger elements are adjustable, in particular pivotable, in a vertical direction, in that the hand element is adjustable, in particular pivotable, in a vertical direction, and/or in that the finger elements are configured to curve in a vertical direction, in particular with respect to the hand element.

6. A sorting installation for articles, in particular packages and/or consignments, having at least two chutes, arranged one above the other, for articles, wherein at least the upper chute is configured according to claim 1, and in that the storage installation of the upper chute is configured to be adjustable, in particular pivotable, from an upper receiving position, assigned to the upper chute, in the direction of the lower chute into a lower discharging position, and back again.

7. The sorting installation according to claim 6, wherein the storage installation is adjustable, in particular pivotable, downwardly in order to discharge the articles from the upper chute into the lower chute, and, preferably, in that the front end of the storage installation, as seen in the transporting direction of the articles along the upper chute, is configured to be adjustable, in particular pivotable, downwards at least substantially as far as the lower chute, in particular the chute base of the lower chute.

8. The sorting installation according to claim 6, wherein the rear end of the storage installation, as seen in the transporting direction of the articles along the upper chute, is adjustable, in particular pivotable, downwards at least substantially as far as the height of a collecting region, assigned to the end of the lower chute, for articles.

9. The sorting installation according to claim 6, wherein the upper chute adjoins, with an upper end, an upper transporting device for articles to be sorted, in particular in the form of a belt conveyor, and/or in that the lower chute adjoins, with an upper end, a lower transporting device for articles to be sorted, in particular in the form of a belt conveyor.

10. A method for sorting articles, in particular packages and/or consignments, with a sorting installation according to claim 6, comprising at least one chute,
   in which articles to be sorted are transported by a transporting device and are sorted at least partially into the at least one chute,
   in which, after sliding down the chute base of the at least one chute, the articles sorted into the at least one chute are received by the storage installation arranged in an upper receiving position,
   in which the storage installation is adjusted, in particular pivoted, from the upper receiving position into a lower discharging position, and
   in which the received articles are removed from the storage installation in the lower discharging position or are transferred to a plant part, in particular a further chute, provided under the storage installation.

11. The method according to claim 10,
   in which the storage installation, in particular the rear end of the storage installation and/or a hand element of the storage installation, is lowered at least substantially onto a collecting region, assigned to the rear end of the lower chute, of the lower chute when the storage installation is adjusted into the lower discharging position, such that, preferably, the minimum spacing between the storage installation, in particular the rear end of the storage installation and/or the hand element of the storage installation, and the collecting region of the lower chute is less than the height of the articles received by the storage installation.

12. A chute for articles, in particular packages and/or consignments, having a chute base for the article to slide down, having at least one storage installation, preferably assigned to the lower end of the chute, for the articles that have slid down along the chute base,
   wherein the storage installation is configured to be adjustable, in particular pivotable, from an upper receiving position for receiving the articles sliding down the chute into a lower discharging position for discharging the received articles, and back again;
   wherein the storage installation has, transversely to the chute base, at least one finger element, in particular a plurality of finger elements that are preferably spaced-apart from one another, and preferably in that the free ends of the finger elements are directed at least partially counter to the transporting direction of the articles along the chute base;
   wherein the finger elements carry a flexible material web that bridges the intermediate spaces between the finger elements, and/or in that the finger elements have at least one material web that circulates around in each case at least one finger element and is driven in the longitudinal direction of the finger elements.

13. A method for sorting articles, in particular packages and/or consignments, with a sorting installation, comprising at least one chute,
   in which articles to be sorted are transported by a transporting device and are sorted at least partially into the at least one chute,
   in which, after sliding down the chute base of the at least one chute, the articles sorted into the at least one chute are received by the storage installation arranged in an upper receiving position,
   in which the storage installation is adjusted, in particular pivoted, from the upper receiving position into a lower discharging position,
   in which the received articles are removed from the storage installation in the lower discharging position or are transferred to a plant part, in particular a further chute, provided under the storage installation,
   in which, when the storage installation is adjusted from the upper receiving position into the lower discharging position, a plurality of finger elements of the storage installation are curved downwards, and
   in which, preferably, the finger elements are curved with respect to one another by the adjustment of flank elements of the finger elements.

14. The method according to claim 13,
   in which the storage installation, in particular the front end of the storage installation and/or the finger elements of the storage installation, is/are lowered at least substantially as far as the chute base of the lower chute when the storage installation is adjusted into the lower discharging position, such that, preferably, the minimum spacing between the storage installation, in particular the front end of the storage installation and/or the finger elements of the storage installation, and the chute base of the lower chute is less than the height of the articles received by the storage installation.

* * * * *

UNITED STATES PATENT AND TRADEMARK OFFICE
CERTIFICATE OF CORRECTION

PATENT NO. : 10,160,599 B2
APPLICATION NO. : 15/596631
DATED : December 25, 2018
INVENTOR(S) : Bernd Hartmann et al.

Page 1 of 1

It is certified that error appears in the above-identified patent and that said Letters Patent is hereby corrected as shown below:

On the Title Page

At item (71) and (72) delete "Elemenhorst" and replace with --Elmenhorst--

Signed and Sealed this
Twelfth Day of March, 2019

Andrei Iancu
*Director of the United States Patent and Trademark Office*